United States Patent
Iida et al.

(10) Patent No.: US 10,563,056 B2
(45) Date of Patent: Feb. 18, 2020

(54) EXPANDABLE THERMOPLASTIC RESIN PARTICLES, THERMOPLASTIC PRE-EXPANDED PARTICLES, AND THERMOPLASTIC EXPANSION-MOLDED ARTICLE

(71) Applicant: KANEKA CORPORATION, Osaka-shi (JP)

(72) Inventors: Atsushi Iida, Takasago (JP); Kirito Suzuki, Takasago (JP); Tatsuya Henmi, Takasago (JP)

(73) Assignee: KANEKA CORPORATION, Osaka-shi (JP)

( * ) Notice: Subject to any disclaimer, the term of this patent is extended or adjusted under 35 U.S.C. 154(b) by 297 days.

(21) Appl. No.: 15/512,986

(22) PCT Filed: Sep. 16, 2015

(86) PCT No.: PCT/JP2015/076248
§ 371 (c)(1),
(2) Date: Mar. 21, 2017

(87) PCT Pub. No.: WO2016/052188
PCT Pub. Date: Apr. 7, 2016

(65) Prior Publication Data
US 2017/0298215 A1  Oct. 19, 2017

(30) Foreign Application Priority Data
Sep. 29, 2014  (JP) .................. 2014-198734

(51) Int. Cl.
*C08L 25/16* (2006.01)
*C08F 220/44* (2006.01)
*C08L 25/04* (2006.01)
*B32B 27/22* (2006.01)
*C08L 9/02* (2006.01)
*C09D 17/00* (2006.01)

(52) U.S. Cl.
CPC .............. *C08L 25/04* (2013.01); *B32B 27/22* (2013.01); *C08L 9/02* (2013.01); *C09D 17/003* (2013.01); *C01P 2004/61* (2013.01); *C08F 220/44* (2013.01); *C08L 25/16* (2013.01)

(58) Field of Classification Search
CPC .... C08F 212/06; C08F 212/10; C08F 220/44; C08L 25/04; C08L 25/12; C08L 25/16; C08J 9/228
See application file for complete search history.

(56) References Cited

U.S. PATENT DOCUMENTS 4,539,335 A * 9/1985 Mori .................... C08J 9/18
521/147
2010/0190877 A1  7/2010 Schips et al.

FOREIGN PATENT DOCUMENTS

| CN | 101687349 | 3/2010 |
|----|-----------|--------|
| JP | 59-204629 A | 11/1984 |
| JP | 60-206849 A | 10/1985 |
| JP | 2001-181433 A | 7/2001 |
| JP | 2004-142260 A | 5/2004 |
| JP | 2007-191518 A | 8/2007 |
| JP | 2007-238771 A | 9/2007 |
| JP | 2007-246566 A | 9/2007 |
| JP | 2010-189535 A | 9/2010 |

OTHER PUBLICATIONS

Extended European Search Report dated Apr. 10, 2018 in European Patent Application No. 15848048.3, 7 pages.
International Search Report dated Dec. 28, 2015, in PCT/JP2015/076248 filed Sep. 16, 2015.

* cited by examiner

*Primary Examiner* — Roberto Rabago
(74) *Attorney, Agent, or Firm* — Oblon, McClelland, Maier & Neustadt, L.L.P.

(57) ABSTRACT

An expandable thermoplastic resin particle including a polymer obtained by a process including polymerizing monomers including 60 to 80 parts by weight of α-methylstyrene and 40 to 20 parts by weight of acrylonitrile. A content of residual monomeric components in the expandable thermoplastic resin particle is not more than 0.5% by weight. When an expanded mold article is produced from the expandable thermoplastic resin particle at an expansion ratio of 10 times, foam cells in a cross section of the expanded mold article have an average chord length of from 20 μm to 60 μm.

17 Claims, No Drawings

EXPANDABLE THERMOPLASTIC RESIN PARTICLES, THERMOPLASTIC PRE-EXPANDED PARTICLES, AND THERMOPLASTIC EXPANSION-MOLDED ARTICLE

TECHNICAL FIELD

The present invention relates to an expandable thermoplastic resin particle having excellent heat resistance.

BACKGROUND ART

An expandable polystyrene resin particles is known well as an expandable thermoplastic resin particle, and an in-mold expanded mold article can be produced inexpensively and easily by using the expandable polystyrene-type resin particle. However, expanded mold articles are not sufficient in dimensional stability under a high-temperature environment for a long period of time upon use of relatively-high-temperature applications such as a thermal insulating material for pipes, a heat-insulating material for roofs, an automotive member, a thermal insulating material for solar systems or the like because the monomer that forms the polymer in the expanded mold article is styrene. The expansion-molded polystyrene article has thus a drawback that it is not suitable for those applications which require heat resistance. Further, even higher heat-resistant performance is required in these application fields in recent years.

In order to solve these problems, as the method for improving the heat resistance, Patent Document 1 proposes a method in which the content ratio among α-methylstyrene, acrylonitrile and styrene is defined. In this method, however, styrene remains in the monomer composition and therefore the heat resistance performance is not sufficient in the quality to meet the market requirement.

In Patent Documents 2 to 4, proposed are the methods in which α-methylstyrene, acrylonitrile, styrene and the like are copolymerized together and further the average chord length or the contents of an easily volatile foaming agent or a plasticizer are controlled to improve heat resistance performance. In these methods, expansion at up to 40 times can be achieved, and an expanded mold article can be produced with excellent surface characteristics. In this method, however, the heat-resistant performance is not sufficient due to the influence of styrene remaining in the monomer composition and thus there is still a room for improvement.

PRIOR ART DOCUMENTS

Patent Documents

Patent Document 1: JP 2001-181433 A
Patent Document 2: JP 2007-191518 A
Patent Document 3: JP 2007-238771 A
Patent Document 4: JP 2007-246566 A

SUMMARY OF THE INVENTION

Problems to be Solved by the Invention

In view of the above-mentioned situations, the object of the present invention is to provide an expandable thermoplastic resin particle having improved heat resistance.

Solutions to the Problems

The present inventors made intensive and extensive studies for the purpose of improving the drawback of the conventional techniques and producing an expandable thermoplastic resin particle having improved heat resistance, and the present invention was accomplished as a result.

The first of the present invention relates to an expandable thermoplastic resin particle comprising a polymer obtained from a monomer composition comprising 60 to 80 parts by weight of α-methylstyrene and 40 to 20 parts by weight of acrylonitrile, wherein a content of residual monomeric components in the particle is not more than 0.5% by weight.

The second of the present invention relates to the expandable thermoplastic resin particle according to the first of the present invention, wherein the expandable thermoplastic resin particle is expandable at an expansion ratio of 2 to 15 times upon use.

The third of the present invention relates to the expandable thermoplastic resin particle according to the first or the second of the present invention, wherein the average chord length of foam cells in a cross section of an expanded mold article produced from the expandable thermoplastic resin particle at an expansion ratio of 10 times is not shorter than 20 and not longer than 60 μm.

The forth of the present invention relates to the expandable thermoplastic resin particle according to the first to the third of the present invention, wherein the percentage of dimensional change of an expanded mold article produced from the expandable thermoplastic resin particle is less than 0.15% as measured after treating the expanded mold article at 90° C. for 24 hours.

The fifth of the present invention relates to the expandable thermoplastic resin particle according to the first to the forth of the present invention, wherein the surface layer of the expandable thermoplastic resin particle is formed by a coating mixture of a plasticizer and a pigment.

The sixth of the present invention relates to a thermoplastic pre-expanded particle produced by expanding the expandable thermoplastic resin particle as recited in the first to the fifth of the present invention at an expansion ratio of 2 to 15 times.

The seventh of the present invention relates to a thermoplastic expanded mold article produced by carrying out the in-mold molding of the thermoplastic pre-expanded particle as recited in the sixth of the present invention.

Effects of the Invention

According to the present invention, an expandable thermoplastic resin particle is provided with improved heat resistance.

MODE FOR CARRYING OUT THE INVENTION

The present invention provides an expandable thermoplastic resin particle comprising a polymer obtained from a monomer composition comprising 60 to 80 parts by weight of α-methylstyrene and 40 to 20 parts by weight of acrylonitrile provided that the total of the monomer composition is 100 parts by weight, wherein a content of residual monomeric components in the particle is not more than 0.5% by weight.

The characteristics of the present invention is that third components such as styrene are not contained which deteriorate heat resistance, and the monomer components that forms the polymer are α-methylstyrene and acrylonitrile. The heat resistance decreases when styrene is contained in the polymer-forming monomer composition as in the case of Patent Document 4

The amount of α-methylstyrene to be used in the present invention is 60 to 80 parts by weight. When the amount of α-methylstyrene to be used is less than 60 parts by weight, the heat resistance of the expandable thermoplastic resin particles tends to deteriorate. When the amount of α-methylstyrene to be used is more than 80 parts by weight, the polymerization conversion rate tends to decrease and consequently a large amount of monomers tends to remain in the expandable thermoplastic resin particles, resulting in the deterioration in heat resistance. The amount of α-methylstyrene is preferably not less than 63 parts by weight, more preferably not less than 65 parts by weight, and is preferably not more than 77 parts by weight, more preferably not more than 75 parts by weight. By adjusting the content of α-methylstyrene more properly, the heat resistance of the resin particles and the adhesiveness between the resin particles further improve upon the expansion at a low expansion ratio.

From the viewpoint of improving the polymerization conversion rate of the composition, the amount of acrylonitrile to be used in the present invention is 20 to 40 parts by weight. When the amount of acrylonitrile to be used is less than 20 parts by weight, the conversion rate of the composition tends to decrease and consequently a large amount of monomers remain in the resin, resulting in the deterioration in heat resistance. When the amount of acrylonitrile to be used is more than 40 parts by weight, the polymerization conversion rate of the composition is unchanged while the resin is colored to a yellowish brown, and further the internal adhesion deteriorates. The amount of acrylonitrile is preferably not more than 37 parts by weight, more preferably not more than 35 parts by weight, and is preferably not less than 23 parts by weight, more preferably not less than 25 parts by weight.

The content of monomeric components in the expandable thermoplastic resin particles according to the present invention is less than 0.5% by weight, preferably not more than 0.4% by weight. When the residual monomer content is not more than 0.5% by weight, good heat resistance is achieved. The term "content of residual monomeric components" as used herein refers to the total amount of residual unreacted components among the components of a monomer composition that forms the expandable thermoplastic resin particles. The monomeric components do not affect the present invention when the content is, for example, not less than 0.1% by weight, particularly not less than 0.2% by weight.

The term "good heat resistance" as used herein refers to a fact that the percentage of dimensional change under heating is less than ±0.15% as measured after heating at 90° C. for 24 hours.

In the present invention, the expansion ratio is preferably 2 to 15 times, more preferably 5 to 10 times. The percentage of dimensional change over time is suppressed and the mechanical strength is enhanced with the expansion ratio falling within the above range. Due to the characteristic feature, the applications such as an automotive member, a heat-insulating member for electrical household appliances, a parts tray for robot lines and the like become available.

With respect to the expandable thermoplastic resin particle according to the present invention, the average chord length of foam cells in a cross section of an expanded mold article produced from the expandable thermoplastic resin particle is preferably not shorter than 15 μm, more preferably not shorter than 20 μm, still more preferably not shorter than 30 μm, and is preferably not longer than 80 μm, more preferably not longer than 60 μm, still more preferably not longer than 50 μm.

When the average chord length is short, the membrane thickness of each of the cells that constitute the expanded article tends to become small, resulting in the deterioration in surface characteristics and heat resistance. When the average chord length is long, heat resistance is maintained while the surface characteristics and internal adhesion tend to degrade.

The average chord length of foam cells in a cross section of the expanded article can be controlled also by changing the amount of a foam cell modifier (a nucleating agent) to be used. For example, the average chord length decreases with the increase in the amount of the foam cell modifier (nucleating agent), and the average chord length increases with the decrease in the amount of the foam cell modifier (nucleating agent).

Examples of the foam cell modifier (nucleating agent) to be used in the present invention include a methyl methacrylate copolymer, a polyethylene wax, talc, a fatty acid bisamide and an ethylene-vinyl acetate copolymer resin. Specific examples of the fatty acid bisamide include methylenebisstearylamide, ethylenebisstearylamide, hexamethylenebis(palmitic acid amide) and ethylenebis(oleic acid amide). Among these, a fatty acid bisamide is preferred, and ethylenebisstearylamide is more preferred because the average chord length can be controlled easily.

The foam cell modifier (nucleating agent) is used preferably in an amount of not less than 0.07 parts by weight, more preferably not less than 0.1 parts by weight, and preferably not more than 0.3 parts by weight, more preferably not more than 0.2 parts by weight, still more preferably not more than 0.15 parts by weight, relative to 100 parts by weight of the monomers that forms the polymer.

Examples of the foaming agent to be used in the present invention include: an aliphatic hydrocarbon having 3 to 5 carbon atoms, such as propane, butane and pentane; an alicyclic hydrocarbon having 4 to 5 carbon atoms, such as cyclobutene and cyclopentane; and a halogenated hydrocarbon, such as methyl chloride, dichlorodifluoromethane and dichlorotetrafluoroethane. These foaming agents may be used singly, or a mixture of two or more of these foaming agents may be used. Among these foaming agents, an aliphatic hydrocarbon is preferred, and butane is preferred because of its good foaming ability. More desirable is butane having an isobutane content of not more than 50° by weight. When the isobutane content is more than 50% by weight, the average chord length tends to become shorter than 20 μm and the membrane thickness of the cells that constitute the expanded article becomes small, resulting in the deterioration in internal adhesion, surface characteristics and heat resistance.

In the present invention, a foaming aid may be used in addition to the foaming agent. An example of the foaming aid is a solvent having a boiling point of not higher than 200° C. under atmospheric pressure. Specific examples of the solvent include: an aromatic organic compound, such as styrene, toluene, ethylbenzene and xylene; a cyclic aliphatic hydrocarbon, such as cyclohexane and methylcyclohexane; ethyl acetate and butyl acetate.

The foaming aid is used preferably in an amount of not less than 1 part by weight, more preferably not less than 5 parts by weight, still more preferably not less than 10 parts by weight, and preferably not more than 40 parts by weight, more preferably not more than 30 parts by weight, still more preferably not more than 25 parts by weight, relative to 100 parts by weight of the foaming agent.

The content of the foaming agent in the expandable thermoplastic resin particle according to the present invention is preferably less than 4% by weight, more preferably not more than 3% by weight. When the content of the foaming agent is not less than 4% by weight, the cycle of the foaming molding tends to become long. The content of the foaming agent may be, for example, not less than 1% by weight, particularly not less than 2% by weight.

The weight average molecular weight Mw of the expandable thermoplastic resin particle according to the present invention is preferably not less than 80,000 and less than 120,000.

When the weight average molecular weight Mw of the expandable styrene resin particle is less than 80,000, surface characteristics and heat resistance tend to deteriorate. When the weight average molecular weight Mw of the expandable styrene resin particles is not less than 120,000, heat resistance is maintained while expandability and surface characteristics tend to deteriorate.

The weight average molecular weight Mw can be controlled by changing the combination of the amount of an initiator and a polymerization temperature to be used in the polymerization of the thermoplastic resin particle. For example, the Mw decreases by increasing the amount of the initiator and/or increasing the polymerization temperature.

The weight average molecular weight Mw of the expandable thermoplastic resin particle according to the present invention is a value that is measured using a gel permeation chromatograph (also sometimes referred to as "GPC" in abbreviation, hereinafter) under the conditions to be described later.

As for the method for producing the expandable thermoplastic resin particle according to the present invention, any one method may be employed selected from a method in which a particle produced by a suspension polymerization in an aqueous medium are impregnated with the foaming agent, and a method in which pellets produced by a bulk polymerization or the like in an aqueous medium are impregnated with the foaming agent.

Among these methods, the production by a suspension polymerization is preferred for the expandable thermoplastic resin particle, since the produced resin particle is spherical and the industrial productivity is good due to the coherent steps of polymerization and foaming agent impregnation.

That is, as the method for producing the expandable thermoplastic resin particle preferable is a method in which the polymerization reaction of a styrene monomer and an acrylic acid ester monomer is initiated in the presence of a suspending agent, a polymerization initiator and optionally other additives, and a forming agent is added during the suspension polymerization or provided after the polymerization for impregnation.

Examples of the suspending agent to be used in the suspension polymerization in the present invention include: a water-soluble polymer, such as polyvinyl alcohol, methyl cellulose, polyacrylamide and polyvinylpyrrolidone; and a poorly soluble inorganic substance, such as tricalcium phosphate and magnesium pyrophosphate. When a poorly soluble inorganic substance is employed, the suspension stabilization effect increases by using in combination an anionic surfactant such as sodium dodecylbenzenesulfonate and a sodium α-olefin sulfonat. The combinated use of a water-soluble polymer and a poorly soluble inorganic substance is also effective.

The polymerization initiator to be used in the suspension polymerization in the present invention may be a radical-generating polymerization initiator which is used conventionally in the production of a thermoplastic polymer. Typical examples of the polymerization initiator include: an azo-type compound such as azobisisobutyronitrile; and a peroxide such as benzoyl peroxide, t-butylperoxy-2-ethylhexanoate, lauroyl peroxide-t-butylperoxyisopropylcarbonate, 1,1-bis(t-butylperoxy)cyclohexane, 1,1-bis(t-amylperoxy)-3,3,5-trimethylcyclohexane, 1,1-bis(t-butylperoxy)-3,3,5-trimethylcyclohexane, t-butylperoxybenzoate, t-butylperoxy-2-ethylhexylcarbonate and di-t-butylperoxy hexahydroterephthalate. These polymerization initiators may be used singly, or a mixture of two or more of them may be used.

The amount of the polymerization initiator to be used in the suspension polymerization in the present invention is preferably not less than 0.01 parts by weight and less than 3 parts by weight relative to 100 parts by weight of the total weight of the monomers. When the amount of the polymerization initiator to be used is less than 0.01 parts by weight, the polymerization rate tends to become slow. When the amount of the polymerization initiator is more than 3 parts by weight, the polymerization reaction tends to be further proceeded to give a difficulty for controlling the reaction.

As the additives that can be added in the suspension polymerization in the present invention, an external additive, a flame retardant agent, a flame retardant aid and the like can be added in such amounts that the effect of the present invention is not interfered.

The flame retardant agent and the flame retardant aid to be used in the present invention may be any conventionally known ones. Specific examples of the flame retardant agent include: a halogenated aliphatic hydrocarbon compound, such as hexabromocyclododecane, tetrabromobutane and hexabromocyclohexane; a brominated phenol, such as tetrabromobisphenol A, tetrabromobisphenol F and 2,4,6-tribromophenol; a brominated phenol derivative, such as tetrabromobisphenol A-bis(2,3-dibromopropylether), tetrabromobisphenol A-bis(2,3-dibromo-2-methylpropylether), tetrabromobisphenol A-diglycidylether and 2,2-bis[4' (2",3"-dibromoalkoxy)-3',5'-dibromophenyl]-propane; and a brominated butadiene-vinyl aromatic hydrocarbon copolymer (for example, "EMERALD3000" manufactured by Chemtura Corporation, and copolymers disclosed in Japanese Unexamined Patent Application Publication (Translation of PCT Application) No. 2009-516019), such as a brominated styrene-butadiene block copolymer, a brominated random styrene-butadiene copolymer and a brominated styrene-butadiene graft copolymer. These flame retardant agents may be used singly, or a mixture of two or more of them may be used.

Specific examples of the flame retardant aid include initiators such as cumene hydroperoxide, dicumyl peroxide, t-butyl hydroperoxide and 2,3-dimethyl-2,3-diphenylbutane.

The external additives and the additive agents to be used in the present invention may be conventionally known ones including a pigment and a plasticizer.

A specific example of the pigment to be used in the present invention includes an organic pigment, such as a phthalocyanine-type pigment (for example, phthalocyanine blue, phthalocyanine green), an azo-type pigment, a condensed azo-type pigment, an anthraquinone-type pigment, a perinone/perylene-type pigment, an indigo/thioindigo-type pigment, an isoindolinone-type pigment, an azomethineazo-type pigment, a dioxazine-type pigment, a quinacridone-type pigment, an aniline black-type pigment, and a triphenylmethane-type pigment.

In the case where a pigment is used, the pigment is used preferably in an amount of not less than 0.001 parts by weight, more preferably not less than 0.003 parts by weight, and preferably not more than 0.1 parts by weight, more preferably not more than 0.07 parts by weight, relative to 100 parts by weight of the polymer-forming monomers.

In the case where a plasticizer is used, specific examples of the plasticizer to be used in the present invention include: a phthalic acid ester compound, such as bis(2-ethylhexyl) phthalate and butylbenzyl phthalate; and diethylene glycol dibenzoate and dipropylene glycol dibenzoate. In recent years, diethylene glycol dibenzoate and dipropylene glycol dibenzoate (including a mixture thereof) are used preferably from the viewpoint of the influence on the environment.

The plasticizer is used preferably in an amount of not less than 0.001 parts by weight, more preferably not less than 0.005 parts by weight, and preferably not more than 0.1 parts by weight, more preferably not more than 0.05 parts by weight, relative to 100 parts by weight of the polymer-forming monomers.

The plasticizer is used preferably in an amount of not less than 0.01 parts by weight, more preferably not less than 0.1 parts by weight, and preferably not more than 5 parts by weight, more preferably not more than 3 parts by weight, relative to 1 part by weight of the pigment.

It is preferred that the surface layer of the expandable thermoplastic resin particle according to the present invention is formed by a coating mixture of the plasticizer and the pigment.

The method for coating the surface of the expandable thermoplastic resin particle according to the present invention with the pigment and the plasticizer is preferably a method in which the expandable thermoplastic resin particles, the pigment and the plasticizer are blended together in a mixing instrument.

Specific examples of the mixing instrument to be used in the present invention include a super mixer, a Nauta mixer, a universal mixer, a Henschel mixer and a Loedige mixer. Among these mixers, a super mixer is preferred because agitation/mixing performance is good and the pigment and the plasticizer can be blended together efficiently.

Specific examples of the external additive and the additive agent other than the pigment and the plasticizer include: a fatty acid triglyceride, such as lauric acid triglyceride, stearic acid triglyceride and linoleic acid triglyceride; a fatty acid diglyceride, such as lauric acid diglyceride, stearic acid diglyceride and linoleic acid diglyceride; a fatty acid monoglyceride, such as lauric acid monoglyceride, stearic acid monoglyceride and linoleic acid monoglyceride; a fatty acid metal salt, such as zinc stearate, calcium stearate, magnesium stearate, aluminum stearate, zinc laurate and calcium laurate; and a nonionic surfactant, such as polyoxyethylene cetylether, polyoxyethylene oleylether, polyoxyethylene stearylether, polyoxyethylene laurate, polyoxyethylene palmitate, polyoxyethylene stearate and polyoxyethylene oleate. These external additives and adherent agents may be used singly, or a mixture of two or more of them may be used. These external additives and additive agents may be added to an aqueous system during the impregnation with the foaming agent. Alternatively, these external additives and additive agents may be added and subjected to the coating of any coating method after dehydration or drying. A preferred example of the coating method is a method in which the external additives and additive agents are added after drying and are coated through mixing/agitation.

The expandable thermoplastic resin particle according to the present invention is pre-expanded at an expansion ratio of 2 to 15 times to produce a thermoplastic pre-expanded particle. Subsequently, the thermoplastic pre-expanded particle is thermally expanded to produce an expanded mold article.

The pre-expansion method to be employed may be a conventional method in which, for example, the expansion is performed by heating with steam or the like using a cylindrical pre-expansion apparatus.

The method for expansion-molding the pre-expanded particles may be a conventional method, for example, a so-called "in-mold expansion molding method", in which, for example the pre-expanded particles are filled in a mold and then are heated by blowing steam or the like against the pre-expanded particles to produce an expanded mold article.

This application claims the benefit of priority to Japanese Patent Application No. 2014-198734 filed on Sep. 29, 2014. The entire contents of the specifications of Japanese Patent Application No. 2014-198734 filed on Sep. 29, 2014 are incorporated herein by reference.

EXAMPLES

Hereinbelow, Examples and Comparative Examples will be described. However, the present invention is not limited by these Examples.

The measurement methods were carried out in the following manners.

<Measurement of Monomeric Components>

The expandable thermoplastic resin particles (1.0 g) were dissolved in dichloromethane (20 ml), then an internal standard solution (cyclopentanol) (0.005 g) was added thereto, and then the monomeric components remaining in the expandable thermoplastic resin particles were measured by gas chromatography (GC) under the following conditions.

GC: GC-14B, manufactured by Shimadzu Corporation
Column: PEG-20M 25%
Chromosorb W 60/80 (3.0 m×3.0 mm I.D.)
Column temperature: 110° C.
Temperature of detector (FID): 170° C.

<Measurement of the Molecular Weight>

The expandable thermoplastic resin particles (0.02 g) were dissolved in tetrahydrofuran (also referred to as "THF" in abbreviation, hereinafter) and then subjected to gel permeation chromatograph (GPC) measurement by GPC under the below-mentioned conditions, thereby obtaining a GPC measurement chart, a weight average molecular weight (Mw) and a number average molecular weight (Mn). The obtained values are relative values in terms of polystyrene.

Measurement device: High-speed GPC device HLC-8220, manufactured by Tosoh Corporation
Columns used: SuperHZM-H×2 columns, SuperH-RC×2 columns, manufactured by Tosoh Corporation
Column temperature: 40° C., mobile phase: THF (tetrahydrofuran)
Flow rate: 0.35 ml/min, injection volume: 10 μL
Detector: RI.

<Pre-Expansion>

The expandable thermoplastic resin particles were charged into a pre-expansion apparatus equipped with a stirrer, and then expanded by heating with steam to produce pre-expanded particles having an apparent expansion ratio of 10 times.

<Evaluation of Moldability>

The expandable thermoplastic resin particles were filled in a plate-like mold having a size of 450 mm high×300 mm wide×20 mm thick, and then in-mold molding was carried out using a molding machine [KR-57, manufactured by Daisen Co., Ltd.] under a blowing steam pressure of 0.8 kgf/cm² to produce an expanded mold article. The condition of the surface of the molded article was evaluated by the observation with naked eyes, and the molded article was also evaluated with respect to the following items.

(1) Evaluation of Adhesiveness

The thermoplastic resin expanded article was broken, and a broken surface of the expanded article was observed to determine the percentage of the particles broken in itself, not those broken at the particle interfaces, thereby determining adhesiveness on the basis of the following criteria.

∘∘: The percentage of broken particles was not less than 90%.
∘: The percentage of broken particles was not less than 80° and less than 90%.
Δ: The percentage of broken particles was not less than 70% and less than 80%.
×: The percentage of broken particles was less than 70°.

(2) Evaluation of the Surface Characteristics

The condition of the surface of the thermoplastic resin expanded article was observed with naked eyes, and the surface characteristics were evaluated on the basis of the following criteria.

∘∘: The surface was not melted and had no voids between particles, and the appearance of the surface was very beautiful.
∘: The surface was not melted and had little voids between particles, and the appearance of the surface was beautiful.
Δ: The surface was melted and had voids between particles, and the appearance of the surface was bad a little bit.
×: The surface was melted and had many voids between particles, and the appearance of the surface was bad.

(3) Measurement of the Average Chord Length in the Cross Section of the Expanded Mold Article The average cell diameter of the expanded mold article was determined by observing a cross section of the expanded mold article and then determining the average chord length from the number of foam cells that present on one straight line (60 mm) on the cross section.

Average chord length $t$=(the length of the line)/[(the number of the foam cells)×(the magnification of the image)]

(4) Evaluation of Heat Resistance

The expanded mold article was cut into a piece having a size of 150×150×20 (t) mm to prepare a sample specimen, and the sample specimen was measured with respect to a percentage of dimensional change under heating in accordance with JIS K6767 (dimensional stability at high temperature: B method) after heating the sample specimen at 90° C. for 24 hours.

∘∘: The percentage of the dimensional change under heating was less than 0.10%.
∘: The percentage of the dimensional change under heating was not less than 0.10% and less than 0.15%.
Δ: The percentage of the dimensional change under heating was not less than 0.15% and less than 0.20%.
×: The percentage of the dimensional change under heating was less than 0.2%.

(Example 1) <Production of the Expandable Thermoplastic Resin Particles>

Into a 6-L autoclave equipped with a stirrer charged were pure water (108 parts by weight), tricalcium phosphate (0.08 parts by weight), sodium α-olefin sulfonate (0.006 parts by weight), di-t-butylperoxyhexahydroterephthalate (0.773 parts by weight) as an initiator, 1,1-bis(t-butylperoxy)cyclohexane (0.16 parts by weight) and ethylenebisstearylamide (0.12 parts by weight) as a nucleating agent. Subsequently, α-methylstyrene monomer (70 parts by weight) and acrylonitrile monomer (30 parts by weight) were charged into the autoclave while stirring the reaction solution at 250 revolutions/min, and then the temperature of the autoclave was raised to 98° C. Subsequently, the autoclave was retained at 98° C. for 9 hours to produce thermoplastic resin particles. Subsequently, the temperature of the autoclave was raised to 114° C., and then the autoclave was retained at 114° C. for 3 hours.

The autoclave was cooled to 95° C., then cyclohexane (0.5 parts by weight) as a foaming aid and butane (2.52 parts by weight) that served as a foaming agent were charged into the autoclave under pressure, and then the temperature of the autoclave was raised to 110° C. again. Subsequently, the autoclave was retained at 110° C. for hours and then cooled to room temperature, and then a polymerization slurry was removed from the autoclave. The polymerization slurry was washed, dehydrated and then dried to produce expandable thermoplastic resin particles.

<Production of Pre-Expanded Particles>

The expandable thermoplastic resin particles were sieved to collect expandable thermoplastic resin particles each having a particle diameter of 0.6 to 1.4 mm.

The expandable styrene resin particles thus collected (1000 g) were subjected to pre-expansion at a bulk expansion ratio of 10 times under the condition of a blowing steam pressure of 0.6 kgf/cm² using an ambient-pressure-type pre-expansion machine. In this procedure, air was also brown together with the blowing steam to control the temperature of the blowing steam. Subsequently, the pre-expanded particles were allowed to leave at ambient temperature for 1 day to age and dry the pre-expanded particles.

<Production of In-Mold Expanded Mold Article>

The thermoplastic resin pre-expanded particles were filled in a plate-like mold having a size of 450 mm high×300 mm wide×20 mm thick using a molding machine [KR-57, manufactured by Daisen Co., Ltd.], and then in-mold molding was carried out under a blowing steam pressure of 0.8 kgf/cm² to produce an expanded mold article.

The expandable thermoplastic resin particles and the expanded mold article were subjected to the evaluations. The results are shown in Table 1.

Example 2

The same procedure as in Example 1 was carried out, except that the monomer composition at the polymerization initiation was changed to a monomer composition comprising 78 parts by weight of the α-methylstyrene monomer and 22 parts by weight of the acrylonitrile monomer in the step <Production of expandable thermoplastic resin particles>, thereby producing expandable thermoplastic resin particles, pre-expanded particles and an in-mold expanded mold article. The results of the evaluations are shown in Table 1.

Example 3

The same procedure as in Example 1 was carried out, except that the monomer composition at the polymerization initiation was changed to a monomer composition comprising 62 parts by weight of the α-methylstyrene monomer and 38 parts by weight of the acrylonitrile monomer in the step <Production of expandable thermoplastic resin particles>, thereby producing expandable thermoplastic resin particles, pre-expanded particles and an in-mold expanded mold article. The results of the evaluations are shown in Table 1.

Example 4

The same procedure as in Example 1 was carried out, except that the retention time at 114° C. was changed to 2 hours in the step <Production of expandable thermoplastic resin particles>, thereby producing expandable thermoplastic resin particles, pre-expanded particles and an in-mold expanded mold article. The results of the evaluations are shown in Table 1.

Example 5

The same procedure as in Example 1 was carried out, except that the amount of ethylenebisstearylamide was changed to 0.20 parts by weight in the step <Production of expandable thermoplastic resin particles>, thereby producing expandable thermoplastic resin particles, pre-expanded particles and an in-mold expanded mold article. The results of the evaluations are shown in Table 1.

Example 6

The same procedure as in Example 1 was carried out, except that the amount of ethylenebisstearylamide was changed to 0.08 parts by weight in the step <Production of expandable thermoplastic resin particles>, thereby producing expandable thermoplastic resin particles, pre-expanded particles and an in-mold expanded mold article. The results of the evaluations are shown in Table 1.

Example 7

Expandable thermoplastic resin particles were produced in the same manner as in the step <Production of expandable thermoplastic resin particles> in Example 1. Subsequently, a mixture of butyl benzyl phthalate (0.01 parts by weight) as a plasticizer and phthalocyanine blue (0.005 weight) as a pigment was charged together with the expandable thermoplastic resin particles into a super mixer [SMV-20, manufactured by KAWATA MFG Co., Ltd.], and these components were blended together for 60 seconds to produce expandable thermoplastic resin particles. Subsequently, pre-expanded particles and an in-mold expanded mold article were produced in the same manner as in Example 1. The results of the evaluations are shown in Table 1.

Example 8

Expandable thermoplastic resin particles were produced in the same manner as in the step <Production of expandable thermoplastic resin particles> in Example 1. Subsequently, a mixture (0.01 parts by weight) of diethylene glycol dibenzoate (50 to 60% by weight) and dipropylene glycol dibenzoate (40 to 50% by weight) (product name of the mixture: JP120, manufactured by J-PLUS Co., Ltd.) as a plasticizer was mixed with phthalocyanine blue (0.005 weight) as a pigment to prepare a mixture, and then the resultant mixture was charged together with the expandable thermoplastic resin particles into a super mixer [SMV-20, manufactured by KAWATA MFG Co., Ltd.], and these components were blended together for 60 seconds to produce expandable thermoplastic resin particles. Subsequently, pre-expanded particles and an in-mold expanded mold article were produced in the same manner as in Example 1. The results of the evaluations are shown in Table 1.

Example 9

Expandable thermoplastic resin particles were produced in the same manner as in the step <Production of expandable thermoplastic resin particles> in Example 1. Subsequently, a mixture (0.01 parts by weight) of diethylene glycol dibenzoate (50 to 60% by weight) and dipropylene glycol dibenzoate (40 to 50° by weight) (product name of the mixture: JP120, manufactured by J-PLUS Co., Ltd.) as a plasticizer was mixed with phthalocyanine blue (0.05 weight) as a pigment to prepare a mixture, and then the resultant mixture was charged together with the expandable thermoplastic resin particles into a super mixer [SMV-20, manufactured by KAWATA MFG Co., Ltd.], and these components were blended together for 60 seconds to produce expandable thermoplastic resin particles. Subsequently, pre-expanded particles and an in-mold expanded mold article were produced in the same manner as in Example 1. The results of the evaluations are shown in Table 1.

Example 10

Expandable thermoplastic resin particles were produced in the same manner as in the step <Production of expandable thermoplastic resin particles> in Example 1. Subsequently, a mixture (0.01 parts by weight) of diethylene glycol dibenzoate (50 to 60% by weight) and dipropylene glycol dibenzoate (40 to 50% by weight) (product name of the mixture: JP120, manufactured by J-PLUS Co., Ltd.) as a plasticizer was mixed with phthalocyanine green (0.05 weight) as a pigment to prepare a mixture, and then the resultant mixture was charged together with the expandable thermoplastic resin particles into a super mixer [SMV-20, manufactured by KAWATA MFG Co., Ltd.], and these components were blended together for 60 seconds to produce expandable thermoplastic resin particles. Subsequently, pre-expanded particles and an in-mold expanded mold article were produced in the same manner as in Example 1. The results of the evaluations are shown in Table 1.

Comparative Example 1

The same procedure as in Example 1 was carried out, except that the monomer composition at the polymerization initiation was changed to a monomer composition comprising 85 parts by weight of α-methylstyrene monomer and 15 parts by weight of acrylonitrile monomer in the step <Production of expandable thermoplastic resin particles>, thereby producing expandable thermoplastic resin particles, pre-expanded particles and an in-mold expanded mold article. The results of the evaluations are shown in Table 1.

Comparative Example 2

The same procedure as in Example 1 was carried out, except that the monomer composition at the polymerization initiation was changed to a monomer composition comprising 55 parts by weight of α-methylstyrene monomer and 45 parts by weight of acrylonitrile monomer in the step <Production of expandable thermoplastic resin particles>, thereby producing expandable thermoplastic resin particles, pre-expanded particles and an in-mold expanded mold article. The results of the evaluations are shown in Table 1.

Comparative Example 3

Expandable thermoplastic resin particles were produced by the method described in Example 1 in JP-A-2007-246566 in the step <Production of expandable thermoplastic resin particles>. Subsequently, expandable thermoplastic resin particles, pre-expanded particles and an in-mold expanded mold article were produced in the same manner as in Example 1. The results of the evaluations are shown in Table 1.

TABLE 1

| | polymerization composition | | | | | | |
|---|---|---|---|---|---|---|---|
| | α-methyl styrene | acrylonitrile | styrene | plasticizer | | pigment | |
| unit | parts by weight | parts by weight | parts by weight | parts by weight | species | parts by weight | species |
| Example 1 | 70 | 30 | 0 | — | — | — | — |
| Example 2 | 78 | 22 | 0 | — | — | — | — |
| Example 3 | 62 | 38 | 0 | — | — | — | — |
| Example 4 | 70 | 30 | 0 | — | — | — | — |
| Example 5 | 70 | 30 | 0 | — | — | — | — |
| Example 6 | 70 | 30 | 0 | — | — | — | — |
| Example 7 | 70 | 30 | 0 | 0.01 | BBP | 0.005 | phthalocyanine blue |
| Example 8 | 70 | 30 | 0 | 0.01 | diethylene glycol dibenzoate/dipropylene glycol dibenzoate | 0.005 | phthalocyanine blue |
| Example 9 | 70 | 30 | 0 | 0.01 | diethylene glycol dibenzoate/dipropylene glycol dibenzoate | 0.05 | phthalocyanine blue |
| Example 10 | 70 | 30 | 0 | 0.01 | diethylene glycol dibenzoate/dipropylene glycol dibenzoate | 0.05 | phthalocyanine green |
| Comparative Example 1 | 85 | 15 | 0 | — | — | — | — |
| Comparative Example 2 | 55 | 45 | 0 | — | — | — | — |
| Comparative Example 3 | 30 | 20 | 50 | — | — | — | — |

| | expandable thermoplastic resin particle | | Evaluation of moldability | | |
|---|---|---|---|---|---|
| | content of residual monomeric components | weight average molecular weight: | average chord length | adhesiveness | surface characteristics | heat resistance |
| unit | % by weight | unit: 10,000 | μm | — | — | — |
| Example 1 | 0.35 | 9 | 50 | ⊚ | ⊚ | ⊚ |
| Example 2 | 0.48 | — | 55 | ⊚ | ⊚ | ○ |
| Example 3 | 0.21 | — | 45 | ○ | ⊚ | ○ |
| Example 4 | 0.48 | 8.8 | 50 | ⊚ | ⊚ | ○ |
| Example 5 | 0.34 | 8.7 | 18 | ⊚ | ○ | ○ |
| Example 6 | 0.35 | 8.7 | 70 | ○ | ○ | ⊚ |
| Example 7 | 0.36 | 9.3 | 50 | ⊚ | ⊚ | ⊚ |
| Example 8 | 0.33 | 9.1 | 50 | ⊚ | ⊚ | ⊚ |
| Example 9 | 0.35 | 9.2 | 50 | ○ | ⊚ | ⊚ |
| Example 10 | 0.35 | 9 | 50 | ○ | ⊚ | ⊚ |
| Comparative Example 1 | 0.60 | — | 50 | ○ | ○ | X |
| Comparative Example 2 | 0.15 | — | 50 | X | ○ | Δ |
| Comparative Example 3 | 0.20 | 22.1 | 25 | ○ | ○ | X |

The invention claimed is:

1. An expandable thermoplastic resin particle, comprising:
   a polymer obtained by a process comprising polymerizing monomers comprising 60 to 80 parts by weight of α-methylstyrene and 40 to 20 parts by weight of acrylonitrile,
   wherein a content of residual monomeric components in the expandable thermoplastic resin particle is not more than 0.5% by weight,
   wherein, when an expanded mold article is produced from the expandable thermoplastic resin particle at an expansion ratio of 10 times, foam cells in a cross section of the expanded mold article have an average chord length of from 20 μm to 60 μm, and
   wherein the expandable thermoplastic resin particle has a weight average molecular weight of from 80,000 to 120,000.

2. The expandable thermoplastic resin particle according to claim 1, wherein the expandable thermoplastic resin particle is expandable at an expansion ratio of 2 to 15 times.

3. The expandable thermoplastic resin particle according to claim 1, wherein, when an expanded mold article is produced from the expandable thermoplastic resin particle and the expanded mold article is treated at 90° C. for 24 hours, a percentage of dimensional change of an expanded mold article caused by the treating is less than 0.15%.

4. The expandable thermoplastic resin particle according to claim 1, wherein the expandable thermoplastic resin particle has a surface layer comprising a plasticizer and a pigment.

5. A thermoplastic pre-expanded particle, produced by expanding the expandable thermoplastic resin particle of claim 1 at an expansion ratio of 2 to 15 times.

6. A thermoplastic expanded mold article, produced by in-mold molding the thermoplastic pre-expanded particle of claim 5.

7. The expandable thermoplastic resin particle according to claim 1, wherein the monomers do not comprise styrene.

8. The expandable thermoplastic resin particle according to claim 1, wherein the monomers comprise 63 to 77 parts by weight of α-methylstyrene and 37 to 23 parts by weight of acrylonitrile.

9. The expandable thermoplastic resin particle according to claim 1, wherein the monomers comprise 65 to 75 parts by weight of α-methylstyrene and 35 to 25 parts by weight of acrylonitrile.

10. The expandable thermoplastic resin particle according to claim 4, wherein the pigment comprises at least one selected from the group consisting of a phthalocyanine pigment, an azo pigment, a condensed azo pigment, an anthraquinone pigment, a perinone/perylene pigment, an indigo/thioindigo pigment, an isoindolinone pigment, an azomethineazo pigment, a dioxazine pigment, a quinacridone pigment, an aniline black pigment, and a triphenylmethane pigment.

11. The expandable thermoplastic resin particle according to claim 4, wherein the plasticizer comprises at least one selected from the group consisting of bis(2-ethylhexyl) phthalate, butylbenzyl phthalate, diethylene glycol dibenzoate, and dipropylene glycol dibenzoate.

12. The expandable thermoplastic resin particle according to claim 1, wherein the monomers consist of the α-methylstyrene and the acrylonitrile.

13. The expandable thermoplastic resin particle according to claim 1, wherein the content of the residual monomeric components in the expandable thermoplastic resin particle is not more than 0.4% by weight.

14. The expandable thermoplastic resin particle according to claim 1, wherein the polymerizing is carried out in the presence of 0.07 to 0.3 parts by weight of a nucleating agent relative to 100 parts by weight of the monomers.

15. The expandable thermoplastic resin particle according to claim 14, wherein the nucleating agent comprises at least one selected from the group consisting of a methyl methacrylate copolymer, a polyethylene wax, talc, a fatty acid bisamide, and an ethylene-vinyl acetate copolymer resin.

16. The expandable thermoplastic resin particle according to claim 1, wherein the foam cells in the cross section of the expanded mold article have the average chord length of from 30 μm to 50 μm.

17. The thermoplastic expanded mold article according to claim 6, wherein foam cells in a cross section of the thermoplastic expanded mold article have an average chord length of from 20 μm to 60 μm.

* * * * *